May 19, 1931.                L. C. GOAD                1,806,344
SHAFT CENTERING SUPPORT
Filed Dec. 29, 1928
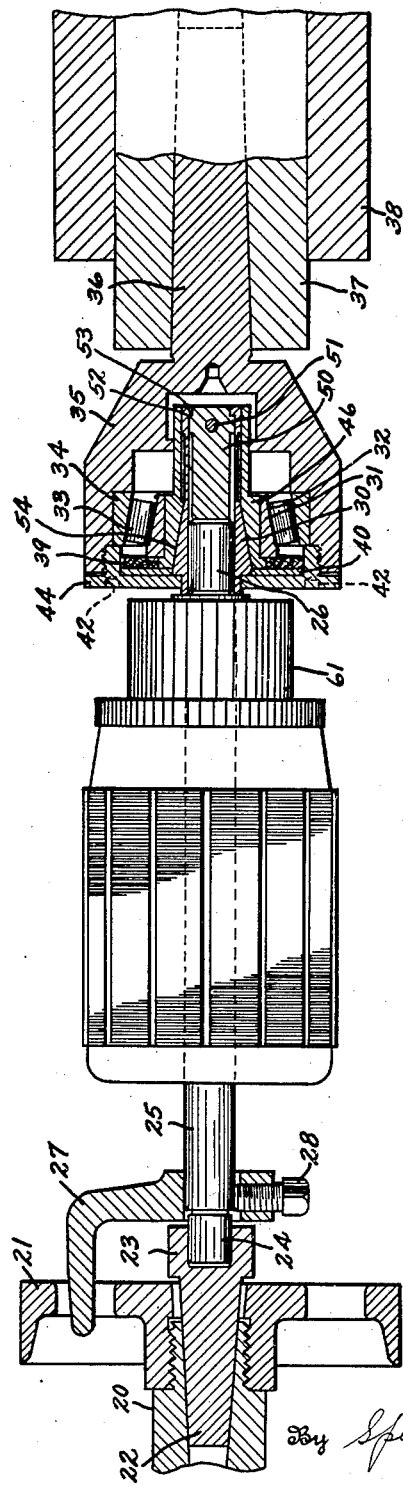
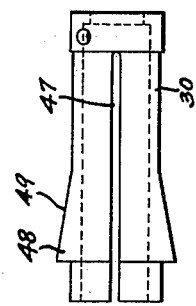
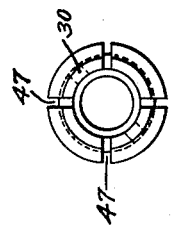
Inventor
Louis C Goad
By Spencer Hardman & Fehr
His Attorneys Patented May 19, 1931

1,806,344

UNITED STATES PATENT OFFICE

LOUIS C. GOAD, OF ANDERSON, INDIANA, ASSIGNOR TO DELCO-REMY CORPORATION, OF DAYTON, OHIO, A CORPORATION OF DELAWARE

SHAFT CENTERING SUPPORT

Application filed December 29, 1928. Serial No. 329,216.

This invention relates to metal cutting or abrading apparatus such as cutting lathes and grinding machines, and includes among its objects a provision of means for quickly and accurately centering a shaft so that it will rotate about the axis of its periphery. This application is a continuation in part of my application Serial No. 121,471, filed July 9, 1926.

Further objects and advantages of the present invention will be apparent from the following description, reference being had to the accompanying drawings, wherein a preferred embodiment of one form of the present invention is clearly shown.

In the drawings:

Fig. 1 is a view partly in longitudinal section showing the application of the present invention.

Fig. 2 is a side elevation of a bushing member on an enlarged scale.

Fig. 3 is an end view of the bushing in Fig. 2.

Referring to the drawings, 20 designates the driving spindle of a lathe to which is attached a driving face plate 21, and a center 22 having a cylindrical recess in its cup-shaped end 23. The recess is coaxial with the spindle 20 and is adapted to receive snugly an end or journal 24 of a shaft 25. The face plate 21 drives the shaft 25 through a lathe dog 27 which is clamped to the shaft 25 by a set screw 28.

The shaft end or journal portion 26 is received by a suitable recess provided in the bushing 30, which is slidably mounted in a sleeve 46 provided with a tapering inner surface 54. Unto this sleeve member 46 is press-fitted the inner race member 31. The recess which receives shaft 26 is exactly coaxial with the conical surface 32 of the race member 30. A plurality of equally dimensioned tapered bearing rollers 33 are located between the inner race 31 and a conical bearing surface 34 of a bearing outer race 35. The race 35 is supported by a conical tapered shank 36 which is received by a suitable tapered bore in a tail stock sleeve 37 which is slidably supported by a tail stock bracket 38. As is usual in lathes, the axis of the tapered bore in the sleeve 37 is coaxial with the axis of the spindle 20 and the center 22. The axis of the conical surface 34 is coaxial with the axis of the tapered shank 36, hence coaxial with the axis of the driving spindle 20 and center 22.

The rollers 33 and the inner race 31 are protected and lubricated by a felt washer 39 and a metal plate 40 fitted into the cylindrical portion of the retaining member 44 which is screw-threaded into the member 35. A plurality of small apertures 42 in member 44 permits the engagement of a suitable tool (not shown) for tightening the assembly together. Members 39, 40 and 44 cooperate to exclude particles of dust and grit from the anti-friction bearing.

In Fig. 2 it is clearly seen that the bushing 30 is provided with a plurality of grooves 47 which extend almost through the entire length of the bushing, and as member 30 is made from material which is inherently resilient, the segments tend to expand radially between the grooves. Member 30 is increased in thickness at 48, thereby providing an inclined or frustro-conical surface 49 which cooperates with the conical surface 54 to accurately center 26 with respect to sleeve 32. In order to provide a suitable stop for the shaft 25 or end of the journal 26, end thrust member 50 has been inserted and is held in position in member 30 by means of a pin or key 51 and a shoulder 52 engaging a shoulder 53. As the tail stop sleeve 37 is moved toward the left, as viewed in Fig. 1, in the usual manner, in order to take up end play between the shaft 25 and its support, the bearing race 31 will cause the sleeve 46 to squeeze the bushing 30 around the journal 26 and thus cause the bearing rod 31 to grip the journal 26; and, as any movement to the right of member 30 takes place, the journal 26 will automatically be centered with respect to the sleeve 37; therefore the journal 26 will be rotated about the axes of the cylindrical surface and a cut made by a turning tool across the face of the commutator 61 which is supported by the shaft, will provide the commutator with a cylindrical surface which is concentric to the cylindrical surface of the journal 26; consequently the periphery of the commutator 61 will be concentric with the bearing which supports the shaft journal 26. This is desirable because the shaft bearing adjacent the commutator is generally supported by the dynamo end frame which supports the brushes bearing upon the commutator. If the commutator periphery is not concentric with the bearing, the commutator will produce movement of the brushes relative to the axis of the armature shaft. When the commutator is rotating at relatively high speed, the brushes may be thrown out of contact with the commutator due to its eccentric movement, although the eccentricity may be relatively small. The present invention therefore provides means for minimizing the eccentricity of the commutator periphery relative to the shaft bearing adjacent thereto. Brush contact pressure will be more uniform and the operation of the dynamo electric machine will be more efficient.

The present invention is particularly adapted for use with shafts which are ground by a centerless grinder which forms the journals 24 and 26 concentric with the main portion of the shaft 25. However, it is apparent that the invention is adapted for supporting shafts which have been surfaced by other cutting and grinding tools.

By providing a lathe tail stock with a shaft centering device including an anti-friction bearing, the spindle-speed of the lathe may be increased over a lathe using the conventional conical tail stock center which enters a conical recess in the end of the shaft which is supported between its head and tail stocks.

While the form of embodiment of the present invention as herein disclosed, constitutes a preferred form, it is to be understood that other forms might be adopted, all coming within the scope of the claims which follow.

What is claimed is as follows:

1. A shaft centering support for a lathe stock, comprising in combination, a bearing outer-race member; a bearing inner-race member; tapered anti-friction members between the race members, the bearing surfaces of said members being so shaped that axial movement of one race member relative to the other tends to align the axes of the race members; means for supporting the outer race member coaxially with the lathe stock; and a cylindrical socket provided coaxially within the bearing track of the inner race member for receiving a cylindrical body, a cylindrical surface of which is to be supported concentric to the axis of the lathe stock.

2. A shaft centering support for a lathe stock, comprising in combination, a bearing outer race member; a bearing inner race member concentric therewith; tapered anti-friction members between the race members, the bearing surfaces of said members cooperating to align the axes of the race members upon axial movement of one race member relative to the other; means for supporting the outer race member coaxially with the lathe stock; and a cylindrical socket provided coaxially within the bearing track of the inner race member for receiving a cylindrical body, a cylindrical surface of which is to be supported concentric to the axis of the lathe stock.

3. A shaft centering support for a lathe stock, comprising in combination, a bearing outer race member; a bearing inner race member concentric therewith; tapered anti-friction members between the race members, the bearing surfaces of said members cooperating to align the axis of the race members upon axial movement of one race member relative to the other; means for supporting the outer race member coaxially with the lathe stock; a cylindrical socket provided coaxially within the bearing track of the inner race member for receiving a cylindrical body, a cylindrical surface of which is to be supported concentric to the axis of the lathe stock; and means for retaining the receiving means and said members in substantial axial alignment, and to exclude foreign matter from the cooperating members.

4. A shaft centering support for a lathe stock, comprising in combination, a bearing outer race member, a bearing inner race member concentric therewith, a plurality of tapered anti-friction members between the race members, a sleeve for supporting the inner race member, said sleeve having a frustro-conical inner surface, a movable bushing provided with a recess for receiving the shaft, said bushing having a frustro-conical surface interrupted at regular intervals by grooves to permit contraction of said conical surface as the bushing is moved into the sleeve, thereby gripping and centering the shaft relative to the lathe stock.

5. In a work centering support for a lathe stock, comprising the combination of an anti-friction bearing assembly consisting of an outer race member and a plurality of tapered roller members, with a sleeve for supporting said inner race member, said sleeve having a frustro-conical inner surface, a bushing having a frustro-conical outer surface cooperating with said sleeve to thereby center the work in the bushing, and an end thrust member in said bushing for preventing endwise movement of the work.

6. A shaft centering support for a lathe tail stock, comprising in combination, a member providing a socket for receiving a cylindrical body, a bearing for the member, and means for clamping the cylindrical body to the socket member and for locating the body concentric with said bearing.

7. A shaft centering support for a lathe tail stock, comprising in combination, a member providing a socket for receiving a cylindrical body, a bearing for the member, and means responsive to relative endwise movement between the member and body for clamping the body to the member and locating the body concentric with said bearing.

8. A shaft centering support for a lathe tail stock, comprising in combination, an anti-friction bearing including inner and outer race members and intermediate rolling members constructed and arranged to provide lateral and axial support; means for supporting one of the race members coaxially with the lathe stock; and means provided by the other race member for receiving a cylindrical body and for causing the body to be nonrotatably secured to said other race member coaxially therewith.

9. A shaft centering support for a lathe tail stock, comprising in combination, an anti-friction bearing including inner and outer race members and intermediate rolling members constructed and arranged to provide lateral and axial support; means for supporting one of the race members coaxially with the lathe stock; and means provided by the other race member for receiving a cylindrical body, said last named means having provisions whereby the body will be nonrotatably secured to said other race member automatically in response to relative endwise movement between the cylindrical body and the bearing.

10. A shaft centering support for a lathe tail stock, comprising in combination, an anti-friction bearing including inner and outer race members and intermediate rolling members constructed and arranged to provide lateral and axial support, means for supporting the outer race member coaxially with the lathe stock; and means provided by the inner race member for receiving a cylindrical body and having provisions whereby the body will be nonrotatably secured to the inner race member automatically in response to relative endwise movement between the body and the bearing.

11. A shaft centering support for a lathe tail stock, comprising in combination, an anti-friction bearing including inner and outer race members and intermediate rolling members constructed and arranged to provide lateral and axial support, said inner race being provided internally with a conical surface concentric with the outer race; means for supporting the outer race coaxially with the lathe stock; a split bushing having a central, interrupted, cylindrical recess for receiving a cylindrical body and an exterior, interrupted, conical surface, concentric with the recess and engageable with the internal conical surface of the inner race; and means for limiting relative endwise movement between the body and bushing to cause the bushing to engage said internal conical surface of the inner race and to cause the bushing to grip the body in response to relative endwise movement between the body and the bearing.

12. A shaft centering support for a lathe tail stock, comprising in combination, a cup-shaped member having a shank adapted to be received by a tail stock; an anti-friction bearing including inner and outer races and intermediate rolling members constructed and arranged to provide lateral and axial support, the outer race being held by the cup-shaped member coaxially with the shank; and a member providing a cylindrical socket within the inner race and coaxial therewith.

13. A shaft centering support for a lathe tail stock, comprising in combination, a cup-shaped member having a shank adapted to be received by a tail stock; an anti-friction bearing including inner and outer races and intermediate rolling members constructed and arranged to provide lateral and axial support, the outer race being held by the cup-shaped member coaxially with the shank; and the inner race providing an internal conical surface coaxial with the outer race; a split bushing having a central, interrupted, cylindrical recess for receiving a cylindrical body and an exterior, interrupted, conical surface concentric with the recess and engageable with the internal conical surface of the inner race; and means for limiting relative endwise movement between the body and bushing to cause the bushing to engage said internal conical surface of the inner race and to cause the bushing to grip the body in response to relative endwise movement between the body and the bearing.

In testimony whereof I hereto affix my signature.

LOUIS C. GOAD.